United States Patent
Nandakumar et al.

(10) Patent No.: US 10,078,580 B2
(45) Date of Patent: Sep. 18, 2018

(54) OPERATIONS TO AVOID WRAPPED MOBILE APPLICATION OPERATIONAL ERRORS DUE TO INTERFERENCE FROM WRAPPER LOGIC COMPONENTS

(71) Applicant: CA, INC., New York, NY (US)

(72) Inventors: Vikrant Nandakumar, Thanisandra (IN); Madhusudhan Ganda, Kadapa (IN); Vardhineedi Satyanarayana Murthy, Mamidikuduru Mandal (IN); Hemanth Kumar Pinninti, Bobbili (IN)

(73) Assignee: CA, INC., New York, NY (US)

( * ) Notice: Subject to any disclaimer, the term of this patent is extended or adjusted under 35 U.S.C. 154(b) by 300 days.

(21) Appl. No.: 14/817,779

(22) Filed: Aug. 4, 2015

(65) Prior Publication Data

US 2017/0039130 A1    Feb. 9, 2017

(51) Int. Cl.
| | | |
|---|---|---|
| G06F 9/44 | (2018.01) | |
| G06F 11/36 | (2006.01) | |
| G06F 8/65 | (2018.01) | |
| G06F 9/445 | (2018.01) | |

(52) U.S. Cl.
CPC ............ *G06F 11/3688* (2013.01); *G06F 8/65* (2013.01); *G06F 9/44526* (2013.01)

(58) Field of Classification Search
CPC ................ G06F 8/60; G06F 8/61; G06F 8/65
See application file for complete search history.

(56) References Cited

U.S. PATENT DOCUMENTS

| | | | |
|---|---|---|---|
| 6,457,142 B1 | 9/2002 | Klemm et al. | |
| 8,572,178 B1 * | 10/2013 | Frazzini | G06F 9/54 709/205 |
| 2012/0216077 A1 * | 8/2012 | Christensen | G06F 11/3612 714/38.1 |
| 2014/0181803 A1 * | 6/2014 | Cooper | G06F 8/60 717/178 |
| 2014/0281706 A1 * | 9/2014 | Adam | G06F 11/1443 714/18 |
| 2015/0370553 A1 * | 12/2015 | Ben-Haim | G06F 8/68 717/169 |
| 2016/0041899 A1 * | 2/2016 | Cragun | G06F 3/04847 714/38.1 |

* cited by examiner

*Primary Examiner* — Li B. Zhen
*Assistant Examiner* — Lenin Paulino
(74) *Attorney, Agent, or Firm* — Sage Patent Group (57) ABSTRACT

A method on a processor of an application wrapper computer includes, for each of a plurality of features of an application program in an application package, associating a wrapper component with the feature, identifying a location of the feature in the application program, and identifying from a portion of the application program at the location whether the feature will have an operational error during execution responsive to a request from the feature for access to a resource of a user device being blocked by the wrapper component. For each of the plurality of features, the method further responds to an operational error being identified by identifying content of an acceptable response to the request to avoid the operational error, and modifying the wrapper component to provide the content of the acceptable response to the request when the wrapper component is blocking the request from accessing the resource.

20 Claims, 7 Drawing Sheets

OPERATIONS TO AVOID WRAPPED MOBILE APPLICATION OPERATIONAL ERRORS DUE TO INTERFERENCE FROM WRAPPER LOGIC COMPONENTS

FIELD

The present disclosure relates to application programs for mobile computing devices. In particular, the present disclosure relates to wrapping application programs with application wrappers that control accessibility of mobile device resources to the application programs.

BACKGROUND

Application programs, also referred to as applications, developed for mobile devices are distributed in an application package containing the elements needed to run the application, such as the program code, resources, certificates and a manifest.

In some cases, it is desirable for an entity such as an application designer, application owner, or enterprise administrator to exercise control over the operation of an application. For example, it may be desirable to exercise control over what features or elements of a device or operating system that the application can access, what time of day those features or elements can be accessed, what security policies are applied to the application, etc.

To accomplish this, the program code of the application may be modified to include code that performs or links to monitoring and control functions. This modification is referred to as "application wrapping." When an application is wrapped, a layer of code is added to the application binary file to add features or modify behavior of the application without making functional changes to the internal application code. The addition of wrapping code may reduce the risk to an enterprise of improper or unauthorized use of an application. For example, wrapping can add security and management features to an application before it is deployed to the enterprise. Moreover, wrapping can enable tracking of application feature usage and reporting of related metrics and errors. However, the wrapping can negatively affect performance of the application due to overhead associated with execution of the wrapper code, and the wrapped application requires more storage memory than the non-wrapped application.

SUMMARY

Some embodiments of the present disclosure are directed to a method of performing operations on a processor of an application wrapper computer. For each of a plurality of features of an application program in an application package, the method associates one of a plurality of wrapper logic components in a set with the feature, identifies a location of the feature in the application program, and identifies from a portion of the application program at the location whether the feature will have an operational error during execution of the portion of the application program by a user device responsive to a request from the feature for access to a resource of the user device being blocked by the one of the plurality of wrapper logic components when executed by the user device to control access by the feature to the resource. For each of the plurality of features, the method further responds to an operational error being identified by identifying content of an acceptable response to the request from the feature to avoid the operational error, and modifying the one of the plurality of wrapper logic components to provide the content of the acceptable response to the request from the feature when the one of the plurality of wrapper logic components is blocking the request from accessing the resource of the user device. The method then combines the wrapper logic components of the set and the application program to form a wrapped application package.

Some other embodiments of the present disclosure are directed to another method of performing operations on a processor of an application wrapper computer. The method includes decompiling executable code of an application package containing an application program to provide a decompiled application package, identifying features of the application program based on content of the decompiled application package, and disassembling the decompiled application package to provide disassembled code. For each of a plurality of features of an application program in an application package, the method associates one of a plurality of wrapper logic components in a set with the feature, identifies a location of the feature in the disassembled code, and identifies from a portion of the disassembled code at the location of the feature in the disassembled code whether the feature will have an operational error during execution of the portion of the disassembled code by a user device responsive to a request from the feature for access to a resource of the user device being blocked by the one of the plurality of wrapper logic components when executed by the user device to control access by the feature to the resource.

For each of the plurality of features, the method further responds to an operational error being identified by identifying an acceptable response to the request from the feature to avoid the operational error, and modifying the one of the plurality of wrapper logic components to provide the acceptable response to the request from the feature when the one of the plurality of wrapper logic components is blocking the request from accessing the resource of the user device. The method then generates modified disassembled code by, for each of the features, inserting an operational hook at the location in the disassembled code where the feature was identified, the operational hook calling one of the wrapper logic components of the set that is configured to control access by the feature to a resource of the user device, assembles the modified disassembled code to provide modified assembled code, and combines the wrapper logic components of the set with the modified assembled code to form a wrapped application package comprising executable code from the modified assembled code and executable code from the wrapper logic components of the set that control calls by the executable code from the modified assembled code to access resources of the user device.

Other methods, computers, and computer program products according to embodiments of the present disclosure will be or become apparent to one with skill in the art upon review of the following drawings and detailed description. It is intended that all such methods, computers, and computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to avoiding operational errors that can arise when a wrapper logic component operates to block an attempted access by an application program to a resource of a user device. Existing application wrapping methodologies use various wrapper logic components to control access by features of any many different type of application program to various resources of the user device. However, different types of application programs can have different levels of operational tolerance for such control without resulting in an operational error.

Developers typically code an application program to operate based on the assumption that if during setup of the application program a set of permissions is granted (e.g., based on user defined preferences or selections) for the application program to access corresponding resources of user devices, then the application program will have access to those resources whenever requested by the application program. However, the application program can be wrapped through the wrapper logic components written by an entirely different entity, and the wrapper logic components can exert unexpected control over those access requests. The wrapper logic components can block a request from a feature of the application program to access a particular resource when an access control rule used by the wrapper logic component is satisfied. Such blocking of resource access can trigger unexpected operational behavior from the application program and result in erroneous operation. The erroneous operation can include ceasing further operations while hanging in an infinite loop or wait state while awaiting a requested response from the resource. Another erroneous operation can include terminating operation due to a mathematical error from processing a register value or memory value that is erroneously interpreted as a valid response from the requested resource. Still another erroneous operation can include causing a change in a conditional branch (e.g., the blocked access erroneously affects the branch condition) during processing of operations of the application program due to the nonresponse from the requested resource.

By way of further example operations, a photo capture or editing application may always expect that the device's camera resource is available for its operations. However one of the wrapper logic components can dynamically control whether the application is allowed access to the camera resource. When a request from the application to the camera resource is blocked, the application can exhibit erroneous operation (e.g., trigger an operating system of the user device to force shutdown due to erroneous application operation).

In some other example operations, a restaurant locator application assumes that the device's location from a GPS resource is available all of the time or, if it is turned-off, the application is notified of that status and configured to then prompt the user to turn-on the GPS resource. However one of the wrapper logic components can dynamically control whether the application is allowed access to the GPS resource. When a request from the application to the GPS resource is blocked by the wrapper logic component, the application can exhibit erroneous operation.

Other examples types of resources of user devices that can be expected by applications to be available for use during operation and the consequential erroneous results that can occur when wrapper logic components selectively block the applications' access to one or more of those resources will be understood in view of the present application disclosure.

Various embodiments of the present disclosure are directed to an application wrapper computer that identifies whether an application feature will have an operational error during execution by a user device responsive to a request from the feature for access to a resource of the user device being blocked by a wrapper logic component when executed by the user device to control access by the feature to the resource. The application wrapper computer identifies content of an acceptable response to the request from the feature to avoid the operational error, and modifies the wrapper logic component to provide the content of the acceptable response to the request from the feature when the wrapper logic component is blocking the request from accessing the resource of the user device. The application wrapper computer then combines the wrapper logic component and the application program to form a wrapped application package.

Figure 1:
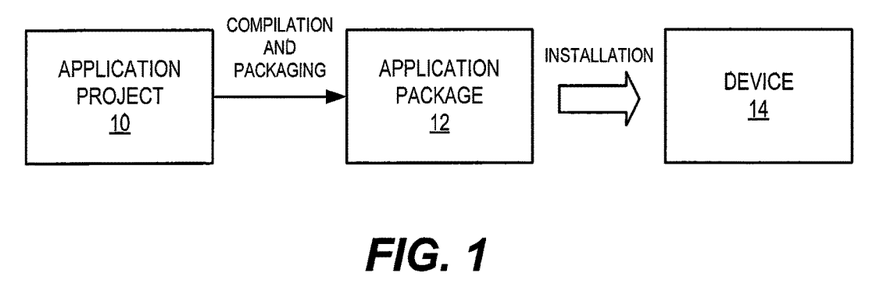
FIG. 1 is a block diagram illustrating the packaging and installation of an application on a user electronic device.

FIG. 1 shows an example development flow for an application developed using the Android operating system and distributed in a package file, such as an Android Package File. An application project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 12, such as an Android Package in the ".apk" format, is then generated including the binary program code in ".dex" files, along with associated resources and a manifest file. During installation onto a device 14, the operating system of the device 14 reads the manifest file and unpacks and installs the program code and associated resources from the .apk file on the device 14. The device 14 may be an end-user device such as a smart phone, tablet computer, laptop computer, desktop computer, appliance terminal (e.g., thermostat), etc.

Figure 2:
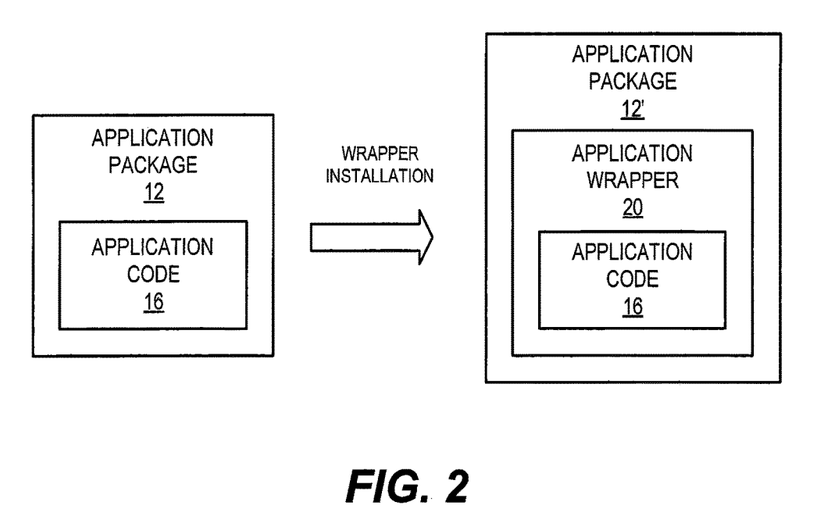
FIG. 2 is a block diagram illustrating installation of an application wrapper that encapsulates application code.

Installation of an application wrapper is illustrated in FIG. 2. As shown therein, before wrapping, an application package 12 includes application code 16. The modified application package 12' is generated that in includes the application wrapper 20 installed "around" to encapsulate the application code 16. The application code 16 is typically modified to include hooks (program code) that facilitate integration with the application wrapper 20. When the application package 12' is installed on a device, the operating system installs the application code 16 wrapped by the application wrapper 20 onto the device.

Figure 3:
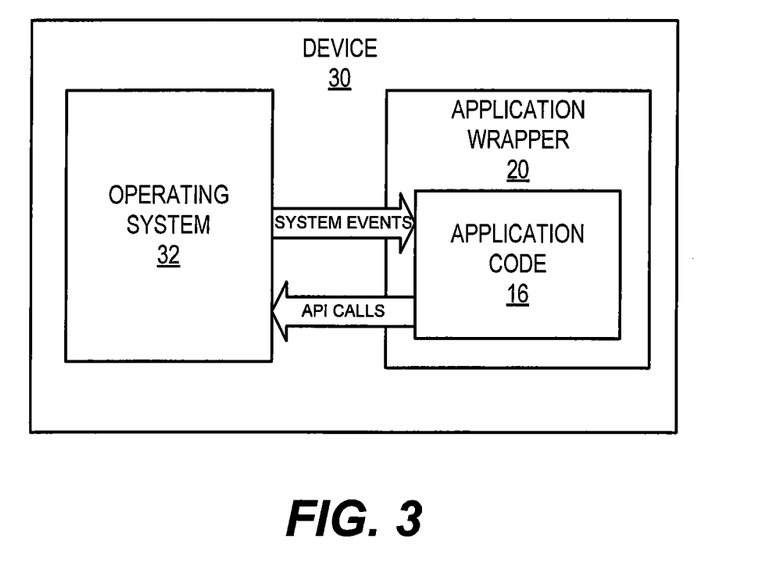
FIGS. 3 and 4 are block diagrams illustrating operation of an application wrapper encapsulating application code.

FIG. 3 illustrates operation of the application wrapper 20 encapsulating the application code 16 on a user electronic device ("device") 30 which includes an operating system 32. The operating system 32 notifies the application code 16 of system events associated with the application. A system event is an action of the system that must be handled by the application code 16, such as "launch app", "OnStart", "OnStop", etc. For example, the operating system 32 may generate a "launch app" event in response to a user tapping on an app in the user interface of the device 30. System events are processed by a responsive function in the application code 16. When an application wrapper 20 is installed, however, the application wrapper 20 may monitor (e.g., intercept) system events and determine if an action should be taken in response to the system event. For example, the application wrapper 20 may record the system event, generate a notification in response to the system event, etc.

The logic of the application wrapper 20 may also determine whether or not the system event should be passed along to the application code 16. Accordingly, the application wrapper 20 may implement logic that monitors for system events provided to the application code 16. Note that the responsive function of the application code 16 may be left in place to processes system events that are passed through to the application code 16 by the application wrapper 20.

For example, the operating system 32 may generate an "onResume" event which is intercepted by the application wrapper 20. If the logic in the application wrapper 20 determines that the application 16 is not authorized to resume, then the application wrapper 20 blocks the event by not forwarding it to the responsive function in the application code 16.

The application wrapper 20 may also monitor (e.g., intercept) application programming interface (API) calls made by the application code 16 to the operating system 32. The application code 16 issues an API call to request services from the operating system 32. For example, an API call may be used to turn on a camera, to read data from storage, to display an image on a screen, to pass data to another application (e.g., to an encryption application, communication application, etc.), or to invoke any other functionality provided by the operating system 32.

The application wrapper 20 may pass the API call along to the operating system 32. Before the API call is passed to the operating system 32, the logic of the application wrapper 20 determines if any action needs to be taken in response to the API call and may also determine whether or not to pass the API call along to the operating system 32.

In general, the application wrapper 20 includes executable code that monitors and/or controls behavior of the application code 16 by intercepting one or more API calls by the application code 16, executes monitoring and/or control code in response to the API call, and thereafter returns control to the application code 16 and/or passes the API call to the operating system 32 for processing.

For example, in case the application wrapper 20 is designed to limit access to a feature or resource on the device 30 during a designate time frame the application wrapper 20 may intercept an API call from the application code 16 that invokes the feature and, if the API call is made outside the designated time frame, block access to the resource by preventing the API call from reaching the operating system 32 instead of passing the API call to the operating system 32. API calls and other operations that can be performed by an application to obtain access to a resource of the device 30 are more generally referred to as "requests" for convenience of reference. The application wrapper 20 can therefore "block" access by a request from the application code 16 to a resource of the device 30 by preventing the request (e.g., API call) from reaching the operating system 32.

Figure 4:
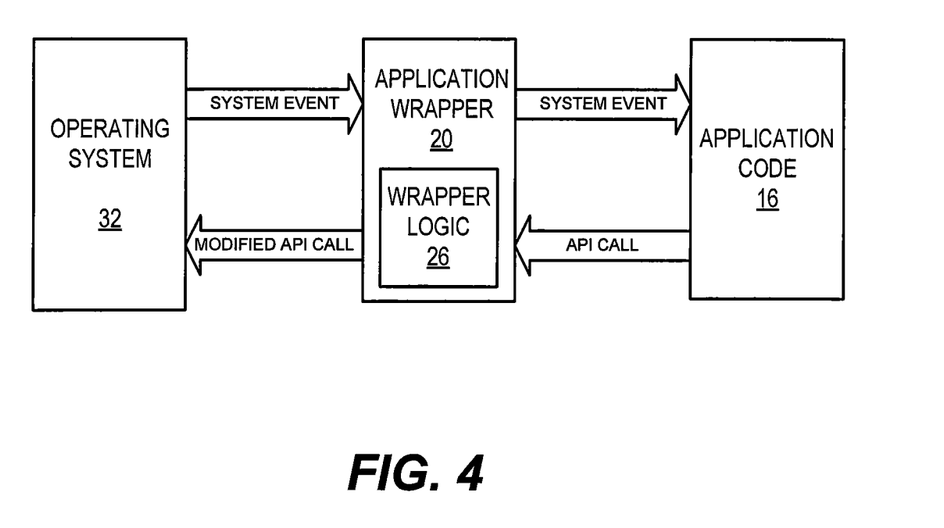

FIG. 4 illustrates the relationship between the operating system 32, the application wrapper 20 and the application code 16 in more detail. In particular, the application wrapper 20 includes wrapper logic 26 that determines how intercepted system events and API calls are processed by the application wrapper 20.

As shown in FIG. 4, the application wrapper 20 intervenes between the operating system 32 and the application code 16 and filters and/or operates on system events and API calls passing between the operating system 32 and the application code 16. When a system event is generated and sent to the application code 16 by the operating system 20, a monitoring function in the application wrapper 20 intercepts the system event and passes it to the wrapper logic 26. The wrapper logic 26 determines how to respond to the system event and whether or not to pass the system event along to the application code 16.

A monitoring function in the application wrapper 20 listens for API calls from the application code 16, and passes the API calls to the wrapper logic 26. The wrapper logic 26 determines how to respond to the API call, whether to modify the API call, and whether or not to pass the API call or the modified API call (or other type of request) along to the operating system 32.

For example, assume that the application code 16 issues a system log API call to log an event that occurred during operation of the application code 16 to a system log. The wrapper logic 26 may determine that the event should be logged to a separate event log, and may modify the API call to log the event to the separate event log rather than to the system log.

It will be appreciated that many different types of wrapping/instrumentation tools are offered by various vendors. For example, application monitoring tools are available, such as Flurry, CA Mobile Application Analytics, and Tealeaf. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Figure 5:
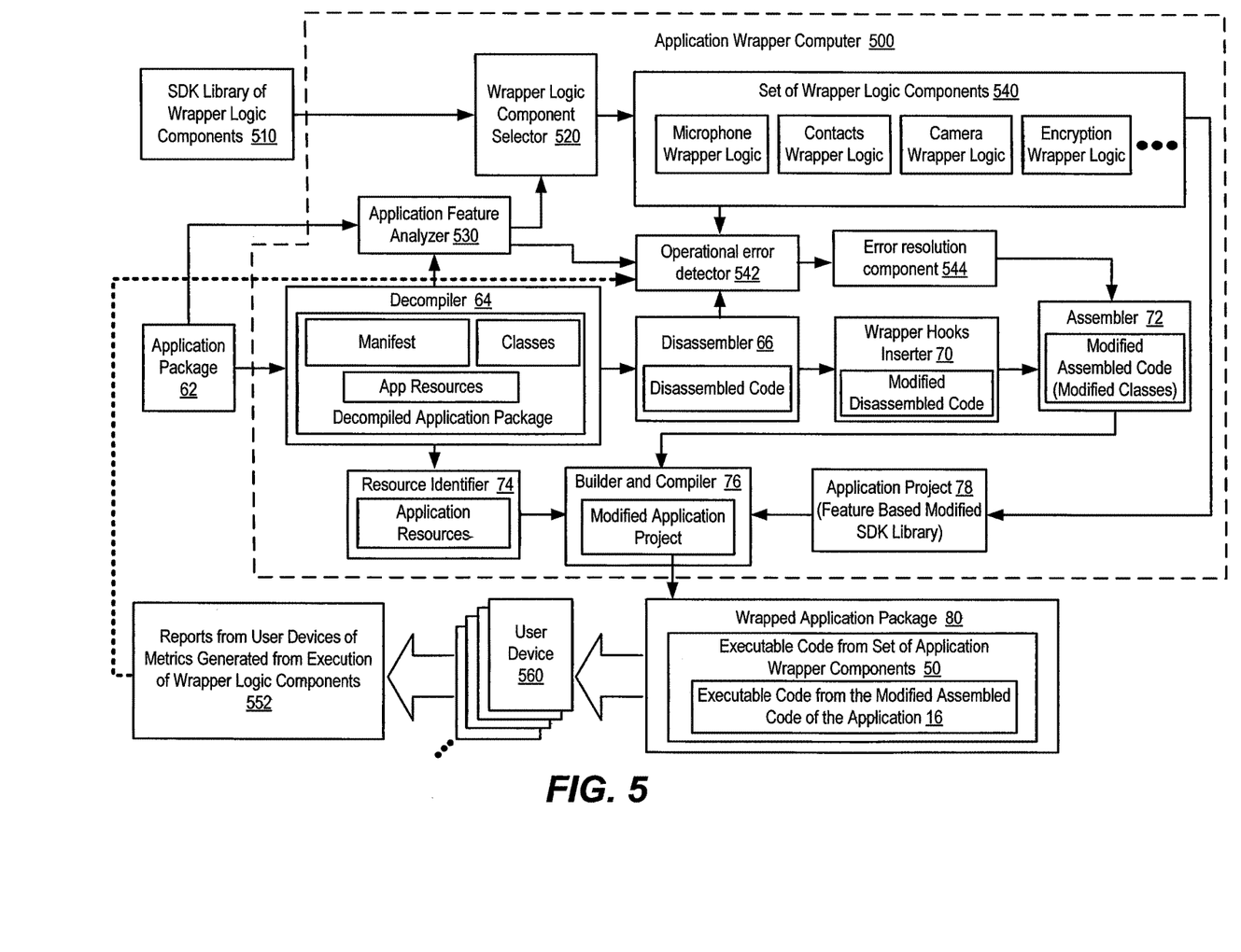
FIG. 5 is a block diagram illustrating operations and data flows of an application wrapper computer to generate a wrapped application package according to some embodiments.
Figure 6:
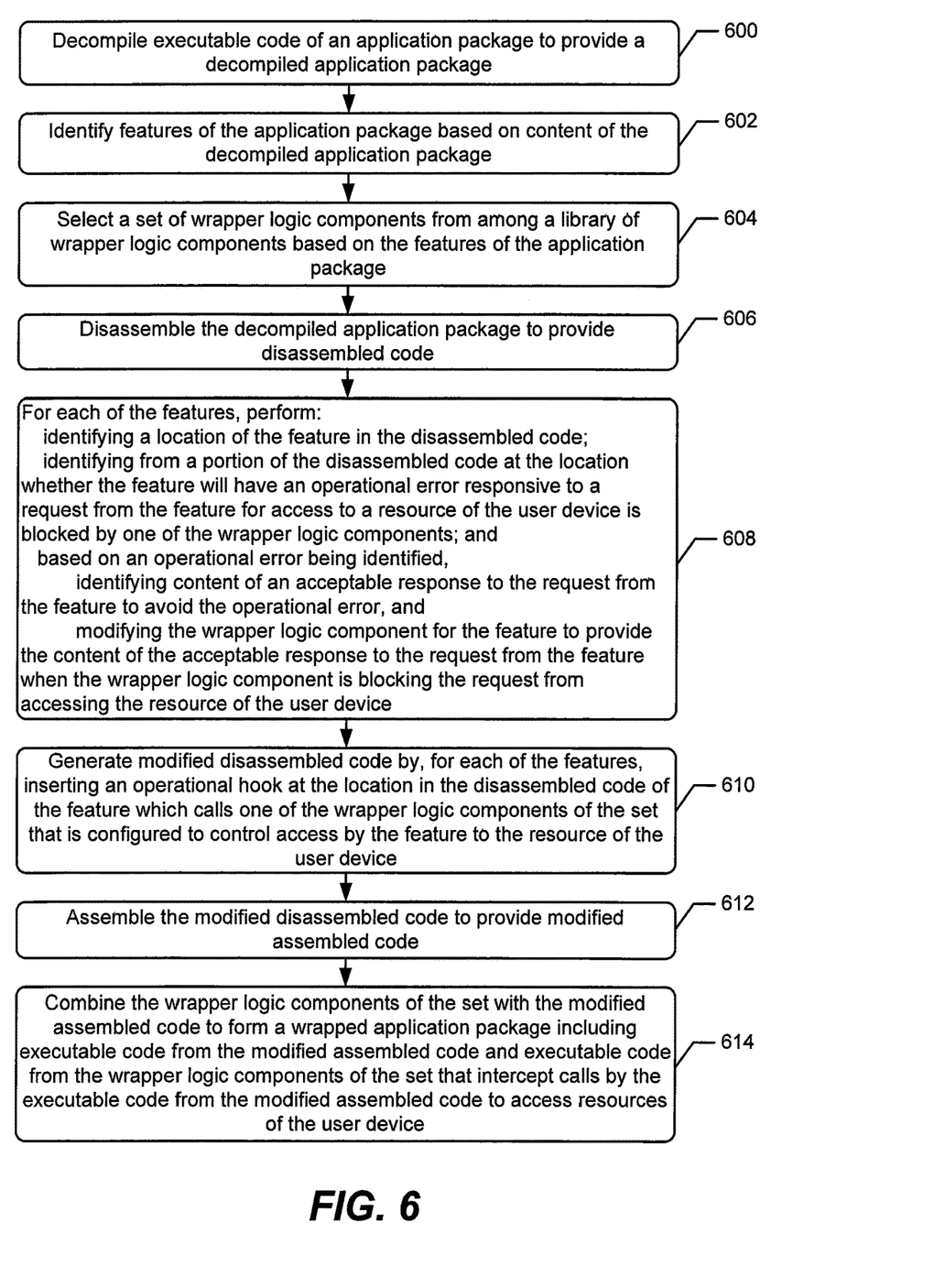
FIGS. 6, 7A and 7B are flowcharts of operations by an application wrapper computer to generate a wrapped application package according to some embodiments.
Figure 7A:
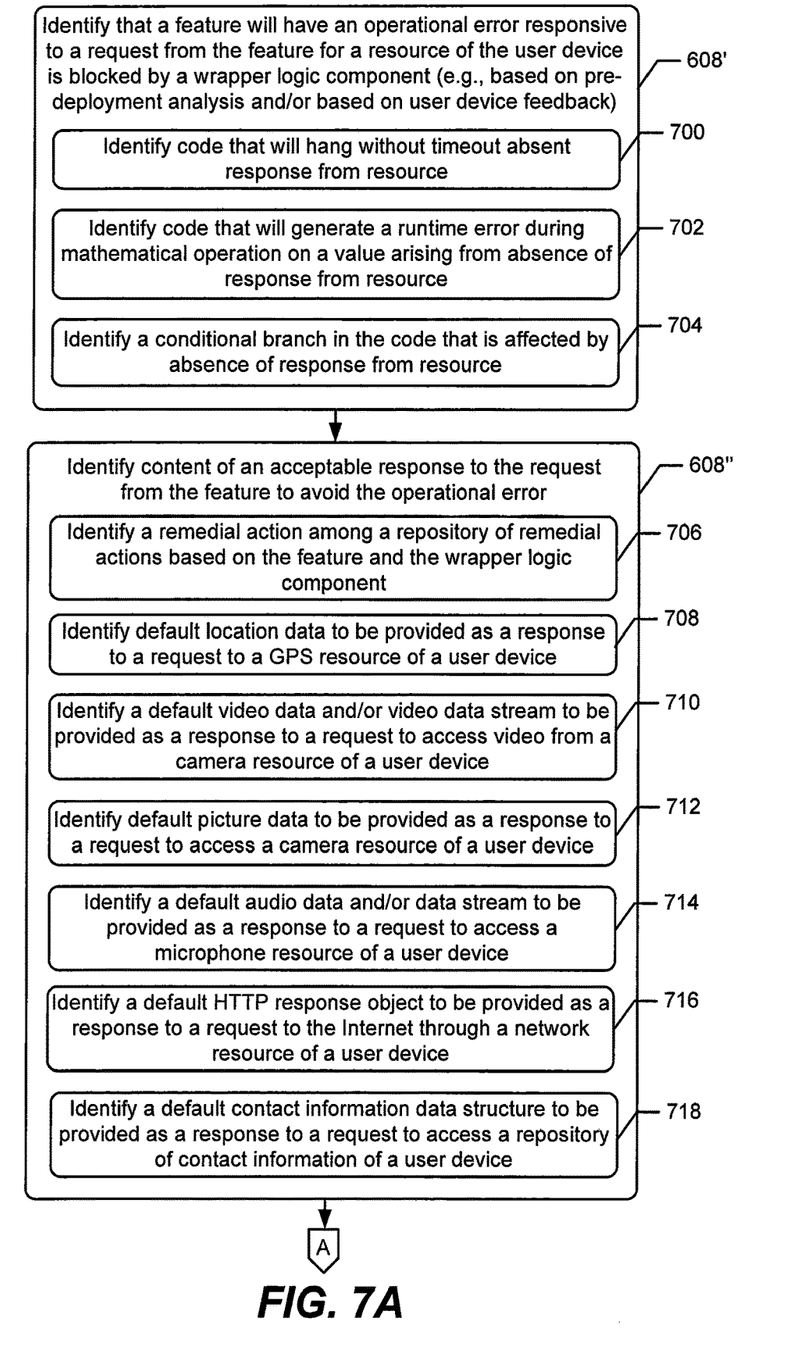
Figure 7B:
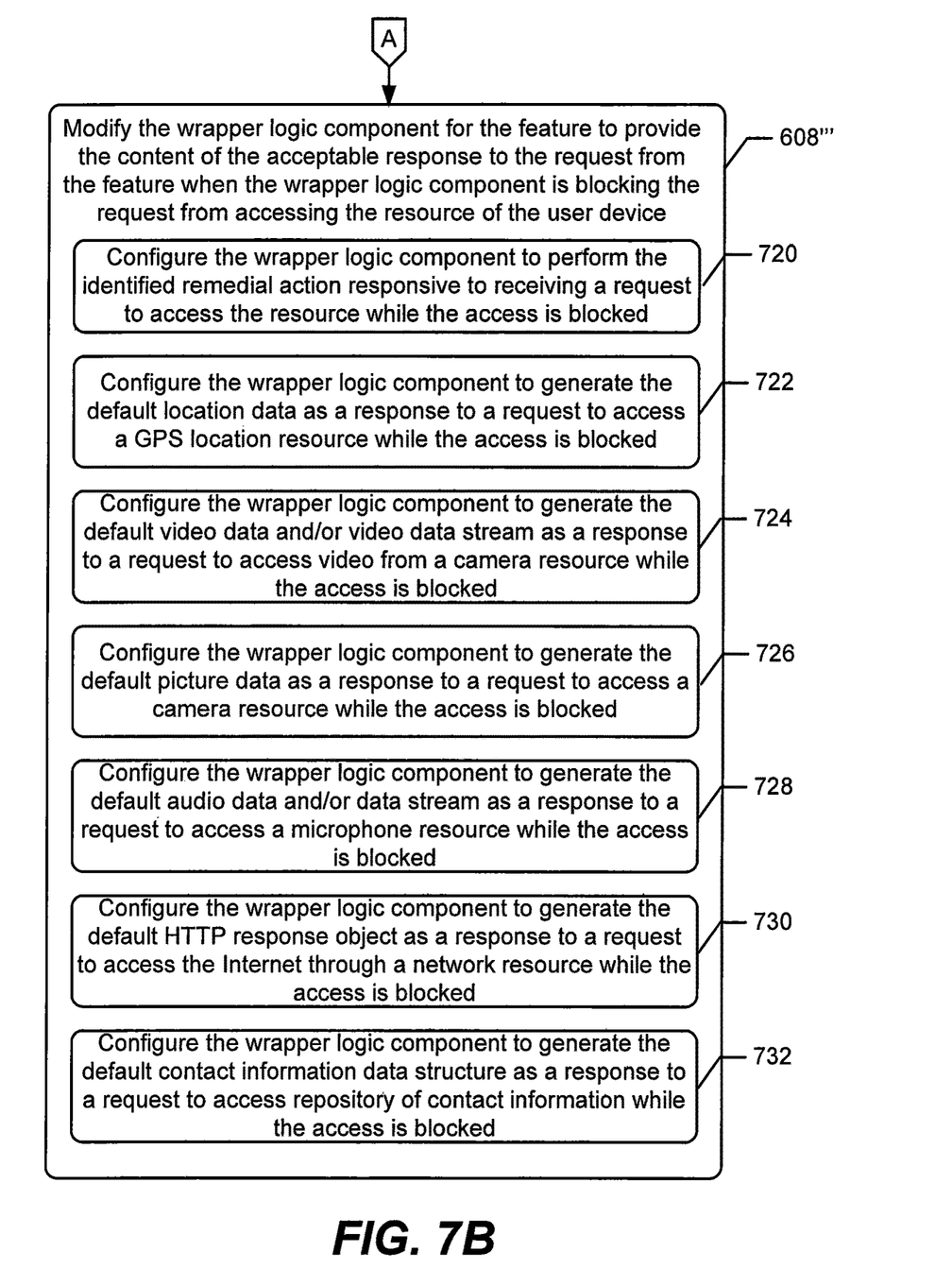

FIG. 5 is a block diagram illustrating operations and data flows of an application wrapper computer 500 to generate a wrapped application package 80. FIGS. 6, 7A and 7B are flowcharts of operations by the application wrapper computer 500 to identify whether an application feature will have an operational error during execution by a user device responsive to a request from the feature for access to a resource of the user device being blocked by the one of a plurality of wrapper logic components when executed by the user device to control access by the feature to the resource. The application wrapper computer 500 responsively identifies content of an acceptable response to the request from the feature to avoid the operational error, and modifies the one of the plurality of wrapper logic components to provide the content of the acceptable response to the request from the feature when the one of the plurality of wrapper logic components is blocking the request from accessing the resource of the user device. The application wrapper computer 500 then combines the wrapper logic components of the set and the application program to form a wrapped application package.

Accordingly, when the modified wrapper logic component receives an API call or other request to access a resource of a user device and determines that the request is to be blocked, the modified wrapper logic component can be configured to then respond back to the API call or other request providing the content of the acceptable response. A feature of the application program that originated the API call or other request therefore receives a response containing the content of the acceptable response. Because the content is configured to avoid operational errors, the application program should continue operation without exhibiting any operational error caused by the modified wrapper logic component having blocked access to the resource of the user device.

Referring to FIGS. 5 and 6, executable code of an application package 62 is decompiled (Block 600) using a decompiler 54, such as apktool, to provide a decompiled application package. The decompiled application package may include an XML format manifest, a set of application resources, and classes. The classes file may by a binary source code file, which, for a Java application written for the Android operating system, can be Java classes compiled to Dalvik VM bytecode in .dex format.

The decompiled application package is disassembled (Block 606), e.g., by a disassembler 66, to provide disassembled code. For example, binary source code of the application is extracted from the decompiled application package 64, and a disassembler 66 for .dex files, such as smali, disassembles the binary source code to .smali format to produce disassembled code, e.g., disassembled source code. Smali files are an assembly format that is native to dex or Dalvik bytecode.

A wrapper hooks inserter 70 analyzes the disassembled code to determine what modifications need to be made to enable monitoring the wrapper logic components from a software development kit (SDK) library 510. The wrapper hooks inserter 70 then inserts (Block 610) necessary wrapper program hooks into the disassembled code to provide modified disassembled code, which may be in the .smali format. The wrapper hooks enable respective ones of the wrapper logic components to monitor, e.g., intercept, system calls to respective ones of the application features and/or to monitor, e.g., intercept, API calls from respective ones of the application features to the system, such as described above regarding FIGS. 3 and 4.

The modified disassembled code is then assembled (Block 612) by an assembler 72, such as baksmali, to provide modified assembled code, which may include modified classes in the .dex format. Application resources can be extracted from the decompiled application package by a resource identifier 74. A builder and complier 76 combines the modified assembled code together with application resources and files of an application project 78, such as a software development kit (SDK) library, to form a wrapped application package 80. The application project 78 contains a set of wrapper logic components 540 which are configured to control access by the application to resources of user devices.

The wrapped application package 80 can be ready to be installed on an end-user electronic device 560, also referred to as a user device, which may correspond to the device 30 described above regarding FIGS. 3 and 4. For an Android application, the wrapped application package 80 can include an .apk file. The wrapped application package 80 is distributed to user devices 560 for execution. The wrapped application package 80 may be distributed through an application server, such as the Google Play Store server for Android applications, the Apple iTunes server for iOS applications, and the Microsoft Windows Store for Windows applications.

In the embodiment of FIG. 5, the application wrapper computer 500 may include an application feature analyzer 530 and a wrapper logic component selector 520 which are configure to generate the set of wrapper logic components 540. The application feature analyzer 530 identifies features of the application package 62 based on content of the decompiled application package.

The application feature analyzer 530 may identify features of the application package 62 by obtaining a manifest file from the decompiled application package (by decompiler 64), and determining the resources of the host user device that the application package will use based on content of the manifest file. The resources of the host user device that the application package will use may be determined based on permissions contained in the manifest file that the application requests to access. For example, the application feature analyzer 530 may identify associations between labels identified by the permissions to resources that have been defined as being associated with wrapper logic components of the library. The wrapper logic component selector 520 may select the set of the wrapper logic components 540 from among the library 510 of wrapper logic components based on comparing the permissions contained in the manifest file to a list of prohibited permissions, and excluding from the set of the wrapper logic components 540 any of the wrapper logic components of the library that request to access a permission that is among the list of prohibited permissions.

The application feature analyzer 530 may identify features of the application package 62 by tracing operational flows through decompiled application code of the decompiled application package, and identify the features of the application package based on comparison of the operational flows to defined rules. For example, the defined rules may identify characteristics of operational flows having defined functionality, which functionality causes the wrapper logic component selector 520 to select certain wrapper logic components from the library 510 for inclusion in the set 540. By way of example, an operational flow that accesses a data storage structure used to manage stored photos is identified as using a device's photo library functionality.

The application feature analyzer 530 may alternatively or additionally identify features of the application package 62 by identifying characteristics of application interfaces of the decompiled application code of the decompiled application package, and identifying the features of the application package based on the characteristics of the application interfaces of the decompiled application code of the decompiled application package.

A set of wrapper logic components is selected (block 604) from among a library 510 (e.g., SDK library) of wrapper logic components, e.g., a SDK library, based on the features of the application package 62. The wrapper logic components of the set are then combined with the modified assembled code to form the wrapped application package 80 which includes executable code 16 from the modified assembled code and executable code 50 from the wrapper logic components of the set that intercept calls by the executable code 16 (e.g., to the operating system 32) and/or that intercept system event messages (e.g., from the operating system 32) to the executable code 16. The executable code 50 from the wrapper logic components of the set may intercept any number types of calls by the executable code 16 and/or intercept any number types of system event messages to the executable code 16. It is to be understood that the executable code 50 is not necessarily configured to intercept all types of calls by the executable code 16 or intercept all types of system event messages to the executable code 16.

The builder and compiler 76 uses the set of wrapper logic components 540 as part of an application project 78 that is combined (Block 614) with the modified assembled code from assembler 72 to form (build) the wrapped application package 80. The wrapped application package 80 can contain executable code from the set of application wrapper components 50, compiled from the feature based modified SDK library 540, and executable code compiled from the modified assembled code.

The application wrapper computer 500 further includes an operational error detector 542 and an error resolution component 544. The detector 542 and the resolution component 540 can be collectively configured to identify operational errors that can be triggered by one or more of the wrapper logic components blocking an attempt by the application program to access a resource of the user device. In the embodiment of FIG. 6, for each of a plurality of features of the application program in the application package 62, the application feature analyzer 530 identifies (block 608) a location of the feature in the application program, such as by identifying a location of the feature in the disassembled code.

The operational error detector 542 identifies (Block 608) from a portion of the application program at the location whether the feature will have an operational error during execution of the portion of the application program by a user device responsive to a request from the feature for access to a resource of the user device being blocked by the one of the plurality of wrapper logic components when executed by the user device to control access by the feature to the resource. Identification of the operational error can include identifying from a portion of the disassembled code at the location of the feature whether the feature will have an operational error during execution of the portion of the disassembled code by the user device responsive to the request from the feature for access to the resource of the user device being blocked by the one of the plurality of wrapper logic components when executed by the user device to control access by the feature to the resource.

Responsive to an operational error being identified, the error resolution component 544 identifies (block 608) content of an acceptable response to the request from the feature to avoid the operational error, and modifies (block 608) the one of the plurality of wrapper logic components to provide the content of the acceptable response to the request from the feature when the one of the plurality of wrapper logic components is blocking the request from accessing the resource of the user device.

The error resolution component 544 and/or the wrapper hooks inserter 70 then generates (block 610) modified disassembled code by, for each of the features, inserting an operational hook at the location in the disassembled code of the feature which calls one of the logic components of the set 540 that is configured to control access by the feature to the resource of the user device. The modified disassembled code can be generated by, for each of the features, inserting an operational hook at the location in the disassembled code where the feature was identified, the operational hook calling one of the wrapper logic components of the set that is configured to control access by the feature to a resource of the user device The assembler 72 assembles (block 612) the modified disassembled code to provide modified assembled code. The builder and compiler 76 then combines (block 614) the wrapper logic components of the set 540, one or more of which may have been modified by the error resolution component 544, with the modified assembled code to form a wrapped application package which includes executable code from the modified assembled code and executable code from the wrapper logic components of the set that intercept and control calls by the executable code from the modified assembled code to access resources of the user device.

FIGS. 7A and 7B illustrate further operations that may be performed to provide the operations of block 608 of FIG. 6. Referring to FIGS. 7A and 7B, the operation for identifying (block 608') whether the feature will have an operational error during execution by the user device, may include identifying (block 700) whether the portion of the application program at the location of the feature will hang without timeout responsive to the request from the feature for access to the resource of the user device being blocked by the one of the plurality of wrapper logic components when executed by the user device to control access by the feature to the resource.

According to an additional or alternative embodiment, the operation for identifying (block 608') whether the feature will have an operational error during execution by the user device, may include identifying (block 702) whether the portion of the application program at the location of the feature will generate a runtime error during mathematical operation on a value arising responsive to the request from the feature for access to the resource of the user device being blocked by the one of the plurality of wrapper logic components when executed by the user device to control access by the feature to the resource.

According to another additional or alternative embodiment, the operation for identifying (block 608') whether the feature will have an operational error during execution by the user device, may include identifying (block 704) whether a conditional branch in the portion of the application program at the location of the feature is affected by the request from the feature for access to the resource of the user device being blocked by the one of the plurality of wrapper logic components when executed by the user device to control access by the feature to the resource.

The operation for identifying (block 608") content of an acceptable response to the request from the feature to avoid the operational error, can include identifying (block 706) a remedial action from among a repository of remedial actions based on the feature and the one of the plurality of wrapper logic components. The operation for modifying (block 608''') the wrapper logic component can include configuring (block 720) the wrapper logic component to perform the identified remedial action responsive to receiving a request to access the resource while the access is blocked.

Accordingly, when the modified wrapper logic component is being executed by one of the user device 560 and receives an API call or other request to access a resource of a user device and determines that the request is to be blocked, the modified wrapper logic component is configured to perform the identified remedial action which can include responding back to the API call or other request providing the content of the acceptable response. A feature of the application program that originated the API call or other request therefore receives a response containing the content of the acceptable response. Because the content is configured to avoid operational errors, the application program should continue operation without exhibiting any operational error caused by the modified wrapper logic component having blocked access to the resource of the user device.

In an additional or alternative embodiment, the identifying (block 608") can include identifying (block 708) default location data to be provided as a response to the request being to access location data from a GPS resource of the user device. The operation for modifying (block 608'") the wrapper logic component can include configuring (block 722) the one of the plurality of wrapper logic components to provide the default location data to the feature as a response to the request from the feature when the one of the plurality of wrapper logic components is blocking the request from accessing the resource of the user device.

In another additional or alternative embodiment, the identifying (block 608") can include identifying (block 710) default video data stream to be provided as a response to the request being to access video from a camera resource of the user device. The operation for modifying (block 608'") the wrapper logic component can include configuring (block 724) the one of the plurality of wrapper logic components to provide the default video data stream to the feature as a response to the request from the feature when the one of the plurality of wrapper logic components is blocking the request from accessing video from the camera resource of the user device.

In another additional or alternative embodiment, the identifying (block 608") can include identifying (block 712) default picture data to be provided as a response to the request being to access a camera resource of the user device. The operation for modifying (block 608'") the wrapper logic component can include configuring (block 726) the one of the plurality of wrapper logic components to provide the default picture data to the feature as a response to the request when the one of the plurality of wrapper logic components is blocking the request from accessing the camera of the user device.

In another additional or alternative embodiment, the identifying (block 608") can include identifying (block 714) default audio data to be provided as a response to the request being to access a microphone resource of the user device. The operation for modifying (block 608'") the wrapper logic component can include configuring (block 728) the one of the plurality of wrapper logic components to provide the default audio data to the feature as a response to the request when the one of the plurality of wrapper logic components is blocking the request from accessing the microphone resource of the user device.

In another additional or alternative embodiment, the identifying (block 608") can include identifying (block 716) default HTTP response object to be provided as a response to the request being to access the Internet through a network resource of the user device. The operation for modifying (block 608'") the wrapper logic component can include configuring (block 730) the one of the plurality of wrapper logic components to provide the default HTTP response object to the feature as a response to the request when the one of the plurality of wrapper logic components is blocking the request from accessing the Internet through the network resource of the user device.

In another additional or alternative embodiment, the identifying (block 608") can include identifying (block 718) default contact information to be provided as a response to the request being to access a repository of contact information of the user device. The operation for modifying (block 608'") the wrapper logic component can include configuring (block 732) the one of the plurality of wrapper logic components to provide the default contact information to the feature as a response to the request when the one of the plurality of wrapper logic components is blocking the request from accessing the repository of contact information of the user device.

In some other embodiments, the operational error detector 542 may use run-time reports 552 received from the user devices 560 to identify operational errors that are caused by one or more of the wrapper logic components selectively blocking application program access to one or more resources of the user devices 560. The reports 552 may include metrics that are generated by the user devices 560 which characterize performance of the wrapper logic components and/or the application program when executed by the user devices 560. The wrapped application package 80 may therefore include program code that is configured to cause the user electronic devices 560 to generate the reports 552 containing content that characterizes performance of the wrapper logic components when executed by the user electronic devices 560 to monitor features of the application during execution of the application by the user electronic devices 560, and to communicate the reports toward the application wrapper computer 500.

The metrics may directly identify run-time errors (e.g., error codes) reported by the operating system of the electronic devices 560 when executing the application program. The metrics may characterizes the performance (e.g., processor utilization, memory utilization, network bandwidth, execution rate, response latency, etc.) of features of the application program. Thus, for example, a metric may provide information usable to identify a feature that hangs when an API call is made to a resource that is known to the operational error detector 542 to be always blocked or selectively blocked by one of the wrapper logic components.

The operational error detector 542 may wait until a threshold number of reports have been received from another threshold number of different user devices 560 before initiating identification of errors due to resource access blocking operations by one or more of wrapper logic components. The operational error detector 542 may combine (e.g., generate statistics from) content of the reports to identify errors, and may apply different weighting to content of some reports relative to other reports depending upon characteristics (e.g., hardware and/or software platform characteristics) of the user devices 560 from which individual ones of the reports were received.

Figure 8:
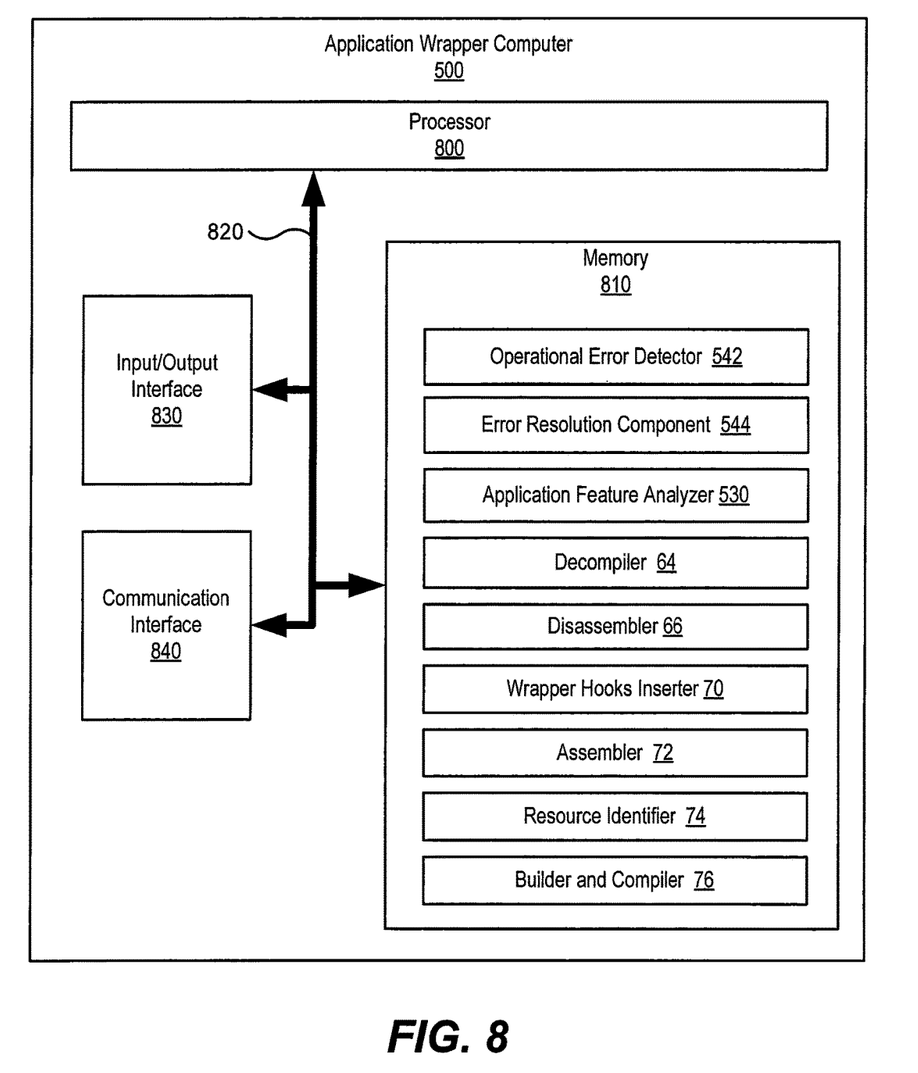
FIG. 8 is a block diagram of an application wrapper computer that generates a wrapped application package according to some embodiments.

FIG. 8 is a block diagram of an application wrapper computer 500 that generates a wrapped application package according to some embodiments. The application wrapper computer 500 is a computing device that includes a processor 800 that controls operation of the computer 500. The processor 800 communicates with a memory 810, an input/output interface 830 and a communication interface 840 via a system bus 820.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an electronic device. The program code can include the operational error detector 542, the error resolution component 544, the application feature analyzer 530, the decompiler 64, the disassembler 66, the wrapper hooks inserter 70, the assembler 72, the resource identifier 74, and the builder and compiler 76.

Although some operations are described herein as being executed by a processor, the operations are not necessarily executed by the same processor. In other words, at least one processor may executed the operations described herein and illustrated by the accompanying drawings.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   performing operations as follows on a processor of an application wrapper computer:
   decompiling executable code of the application package to provide a decompiled application package comprising disassembled code;
   for each of a plurality of features of an application program in the decompiled application package, performing:
   associating one of a plurality of wrapper logic components in a set with a feature of the plurality of features;
   identifying a location of the feature in the disassembled code;
   identifying from a portion of the disassembled code at the location that the feature will have a potential operational error of the application program during execution of the portion of the disassembled code by a user device responsive to a request from the feature for access to a resource of the user device, access to the resource being blocked by the one of the plurality of wrapper logic components that, when executed by the user device, controls access to the resource of the user device; and
   responsive to the potential operational error of the application program being identified,
   identifying default content to provide in response to the request for access to the resource of the user device from the feature to avoid the potential operational error of the application program occurring during execution of the portion of the disassembled code, and
   modifying the one of the plurality of wrapper logic components to provide the default content in response to the request for access to the resource of the user device from the feature when the one of the plurality of wrapper logic components is blocking the feature of the disassembled code from accessing the resource of the user device; and
   generating modified disassembled code by, for each of the features, inserting an operational hook at the location in the disassembled code where the feature was identified, the operational hook calling one of the wrapper logic components of the set that is configured to control access by the feature to a resource of the user device;
   assembling the modified disassembled code to provide modified assembled code; and
   combining the wrapper logic components of the set with the modified assembled code to form a wrapped application package comprising executable code from the modified assembled code and executable code from the wrapper logic components of the set that control calls by the executable code from the modified assembled code to access resources of the user device.

2. The method of claim 1, wherein identifying default content to provide in response to the request for access to the resource of the user device from the feature to avoid the potential operational error of the application program occurring during execution of the portion of the disassembled code, comprises:
   identifying default media content to be provided as a response to the request being to access a media producing resource of the user device.

3. The method of claim 2, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:
   configuring the one of the plurality of wrapper logic components to provide the default media content to the feature as a response to the request when the one of the plurality of wrapper logic components is blocking the request from accessing the media producing resource of the user device.

4. The method of claim 1, wherein identifying from a portion of the disassembled code at the location that the feature will have a potential operational error of the application program during execution of the portion of the disassembled code by a user device responsive to a request from the feature for access to a resource of the user device, access to the resource being blocked by the one of the plurality of wrapper logic components that, when executed by the user device, controls access to the resource of the user device, comprises:

identifying that the portion of the disassembled code at the location of the feature will hang without timeout responsive to the request from the feature for access to the resource of the user device, access to the resource being blocked by the one of the plurality of wrapper logic components that, when executed by the user device, controls access to the resource of the user device.

5. The method of claim 1, wherein identifying from a portion of the disassembled code at the location that the feature will have a potential operational error of the application program during execution of the portion of the disassembled code by a user device responsive to a request from the feature for access to a resource of the user device, access to the resource being blocked by the one of the plurality of wrapper logic components that, when executed by the user device, controls access to the resource of the user device, comprises:

identifying that the portion of the disassembled code at the location of the feature will generate a runtime error during mathematical operation on a value arising responsive to the request from the feature for access to the resource of the user device, access to the resource being blocked by the one of the plurality of wrapper logic components that, when executed by the user device, controls access to the resource of the user device.

6. The method of claim 1, wherein identifying from a portion of the disassembled code at the location that the feature will have a potential operational error of the application program during execution of the portion of the disassembled code by a user device responsive to a request from the feature for access to a resource of the user device, access to the resource being blocked by the one of the plurality of wrapper logic components that, when executed by the user device, controls access to the resource of the user device, comprises:

identifying that a conditional branch in the portion of the disassembled code at the location of the feature is affected by the request from the feature for access to the resource of the user device, access to the resource being blocked by the one of the plurality of wrapper logic components that, when executed by the user device, controls access to the resource of the user device.

7. The method of claim 1, wherein the identifying default content to provide in response to the request for access to the resource of the user device from the feature to avoid the potential operational error of the application program occurring during execution of the portion of the disassembled code, comprises:

identifying a remedial action from among a repository of remedial actions based on the feature and the one of the plurality of wrapper logic components.

8. The method of claim 1, wherein identifying default content to provide in response to the request for access to the resource of the user device from the feature to avoid the potential operational error of the application program occurring during execution of the portion of the disassembled code, comprises:

identifying default location data to be provided as a response to the request being to access location data from a GPS resource of the user device.

9. The method of claim 8, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default location data to the feature as a response to the request from the feature when the one of the plurality of wrapper logic components is blocking the request from accessing the resource of the user device.

10. The method of claim 1, wherein identifying default content to provide in response to the request for access to the resource of the user device from the feature to avoid the potential operational error of the application program occurring during execution of the portion of the disassembled code, comprises:

identifying default video data stream to be provided as a response to the request being to access video from a camera resource of the user device.

11. The method of claim 10, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default video data stream to the feature as a response to the request from the feature when the one of the plurality of wrapper logic components is blocking the request from accessing video from the camera resource of the user device.

12. The method of claim 1, wherein identifying default content to provide in response to the request for access to the resource of the user device from the feature to avoid the potential operational error of the application program occurring during execution of the portion of the disassembled code, comprises:

identifying default picture data to be provided as a response to the request being to access a camera resource of the user device.

13. The method of claim 12, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default picture data to the feature as a response to the request when the one of the plurality of wrapper logic components is blocking the request from accessing the camera of the user device.

14. The method of claim 1, wherein identifying default content to provide in response to the request for access to the resource of the user device from the feature to avoid the potential operational error of the application program occurring during execution of the portion of the disassembled code, comprises:

identifying default audio data to be provided as a response to the request being to access a microphone resource of the user device.

15. The method of claim 14, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default audio data to the feature as a response to the request when the one of the plurality of wrapper logic components is blocking the request from accessing the microphone resource of the user device.

16. The method of claim 1, wherein identifying default content to provide in response to the request for access to the resource of the user device from the feature to avoid the potential operational error of the application program occurring during execution of the portion of the disassembled code, comprises:

identifying default HTTP response object to be provided as a response to the request being to access the Internet through a network resource of the user device.

17. The method of claim 16, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default HTTP response object to the feature as a response to the request when the one of the plurality of wrapper logic components is blocking the request from accessing the Internet through the network resource of the user device.

18. The method of claim 1, wherein identifying default content to provide in response to the request for access to the resource of the user device from the feature to avoid the potential operational error of the application program occurring during execution of the portion of the disassembled code, comprises:

identifying default contact information to be provided as a response to the request being to access a repository of contact information of the user device.

19. The method of claim 18, wherein the modifying the one of the plurality of wrapper logic components to provide the default content in response to the request for access to the resource of the user device from the feature when the one of the plurality of wrapper logic components is blocking the feature of disassembled code from accessing the resource of the user device, comprises:

configuring the one of the plurality of wrapper logic components to provide the default contact information to the feature as a response to the request when the one of the plurality of wrapper logic components is blocking the request from accessing the repository of contact information of the user device.

20. An application wrapper computing device comprising:

a memory coupled to a processor of the application wrapper computer, the memory storing computer readable program code that when executed by the processor causes the processor to perform operations comprising:

decompiling executable code of an application package containing an application program to provide a decompiled application package;

identifying features of the application program based on content of the decompiled application package;

disassembling the decompiled application package to provide disassembled code;

for each of the features of the application program in the decompiled application package, the processor performing operations comprising:

associating one of a plurality of wrapper logic components in a set with the feature;

identifying a location of the feature in the disassembled code;

identifying from a portion of the disassembled code at the location of the feature in the disassembled code that the feature will have a potential operational error of the application program during execution of the portion of the disassembled code by a user device responsive to a request from the feature for access to a resource of the user device, access to the resource being blocked by the one of the plurality of wrapper logic components that, when executed by the user device, controls access to the resource of the user device; and         responsive to the potential operational error of the application program being identified,         identifying default content to provide in response to the request for access to the resource of the user device from the feature to avoid the potential operational error of the application program occurring during the execution of the portion of the disassembled code, and         modifying the one of the plurality of wrapper logic components to provide the default content in response to the request for access to the resource of the user device from the feature when the one of the plurality of wrapper logic components is blocking the feature of the disassembled code from accessing the resource of the user device;

generating modified disassembled code by, for each of the features, inserting an operational hook at the location in the disassembled code where the feature was identified, the operational hook calling one of the wrapper logic components of the set that is configured to control access by the feature to a resource of the user device;

assembling the modified disassembled code to provide modified assembled code; and     combining the wrapper logic components of the set with the modified assembled code to form a wrapped application package comprising executable code from the modified assembled code and executable code from the wrapper logic components of the set that control calls by the executable code from the modified assembled code to access resources of the user device.

* * * * *